United States Patent
Ekman et al.

(10) Patent No.: US 7,215,957 B2
(45) Date of Patent: May 8, 2007

(54) HANDOVER IN A MOBILE COMMUNICATION SYSTEM

(75) Inventors: Jani Ekman, Tampere (FI); Janne Kallio, Mutala (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/927,601

(22) Filed: Aug. 10, 2001

(65) Prior Publication Data

US 2002/0065079 A1 May 30, 2002

Related U.S. Application Data

(63) Continuation of application No. PCT/EP00/01078, filed on Feb. 10, 2000.

(30) Foreign Application Priority Data

Feb. 11, 1999 (GB) ................... 9903125.4

(51) Int. Cl.
*H04Q 7/20* (2006.01)
(52) U.S. Cl. ............. 455/436; 455/439; 455/435.1; 455/435.3; 455/437; 370/331
(58) Field of Classification Search ......... 455/436, 455/439, 432, 442, 555, 550, 403, 422, 432.1, 455/550.1, 422.1, 424, 425, 456.5, 458.6, 455/561, 453, 435.1, 435.2, 435.3, 437, 438, 455/440, 441, 443, 444, 445, 452.1, 451, 455/456.2, 456.3, 464, 525, 135; 370/337, 370/229, 331, 230, 401, 389, 466, 395.1, 370/352, 355, 351, 224, 332, 338, 349, 328, 370/356; 379/219, 221.08, 221.09; 705/79, 705/40, 26; 375/145, 354, 132, 344, 368, 375/141, 346, 347, 348, 349, 130, 267, 299, 375/367, 358, 356, 134, 137, 149, 355
See application file for complete search history.

(56) References Cited

U.S. PATENT DOCUMENTS 5,949,773 A * 9/1999 Bhalla et al. ............... 370/331

(Continued)

FOREIGN PATENT DOCUMENTS

EP 0766490 A 4/1997

OTHER PUBLICATIONS

Bora A. Akyol and Donald C. Cox; "Handling Mobility in a Wireless ATM Network", Proceedings Of IEEE Infocom 1996, Conference on Computer Communications, 15th Annual Joint Conference of the IEEE Computer and Communications Societies, Networking the Next Generation, San Francisco, Ca., Mar. 24-28, 1996, vol. 3, pp. 1405-1413.
Sami Tabbane; Evaluation of Handover Target Cell Determination Algorithms for Heterogeneous Cellular Environments, 1997 IEEE International Conference on Communications, Montreal, Canada, Jun. 8-12, 1997, vol. 1, pp. 396-400.

*Primary Examiner*—Nguyen T. Vo
*Assistant Examiner*—Charles Chow
(74) *Attorney, Agent, or Firm*—Squire, Sanders & Dempsey L.L.P.

(57) ABSTRACT

A cellular communications network comprises a plurality of gateways for controlling cells in the cellular communications network, the gateways being arranged to receive RF information from at least one mobile station in the network, at least one gatekeeper connected to said gateways by a switched packet communication path, wherein each gateway includes means for generating a handover required indication for a call in which the gateway is engaged and packet generating means for generating a packet addressed to said gatekeeper and including control information comprising a candidate list of alternative cells to which the call could possibly be transferred and wherein the gatekeeper includes packet generating means for generating a packet for sending a handover request for handing over the call to one of said alternative cells.

18 Claims, 13 Drawing Sheets

U.S. PATENT DOCUMENTS

| | | | |
|---|---|---|---|
| 6,161,008 A * | 12/2000 | Lee et al. | 455/414 |
| 6,233,222 B1 * | 5/2001 | Wallentin | 370/229 |
| 6,366,576 B1 * | 4/2002 | Haga | 370/352 |
| 6,366,893 B2 * | 4/2002 | Hannula et al. | 705/40 |
| 6,400,951 B1 * | 6/2002 | Vaara | 455/436 |
| 6,421,339 B1 * | 7/2002 | Thomas | 370/352 |
| 6,539,237 B1 * | 3/2003 | Sayers et al. | 455/555 |
| 2002/0065079 A1 * | 5/2002 | Ekman et al. | 455/436 Q |
| 2002/0147008 A1 * | 10/2002 | Kallio | 455/426 |

* cited by examiner

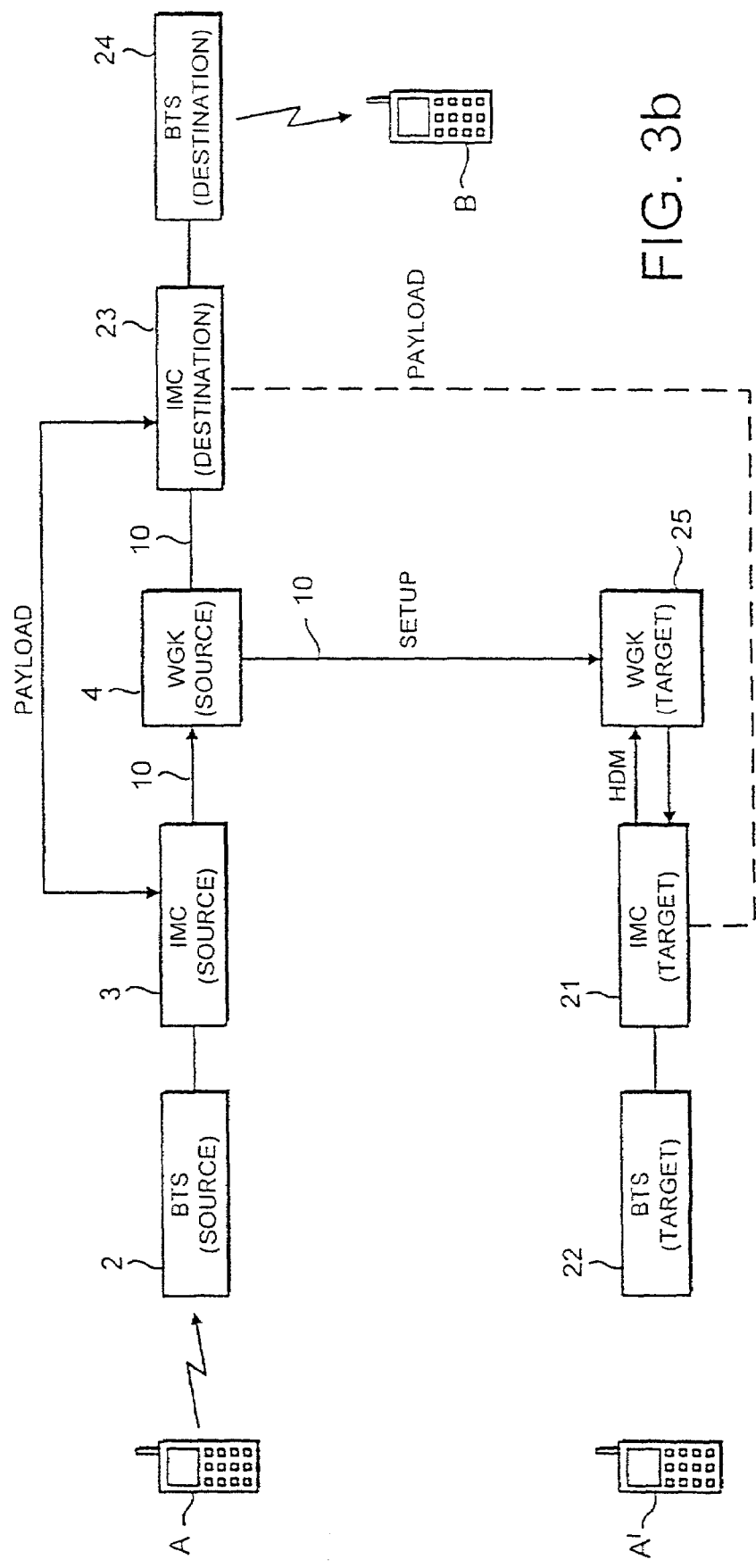

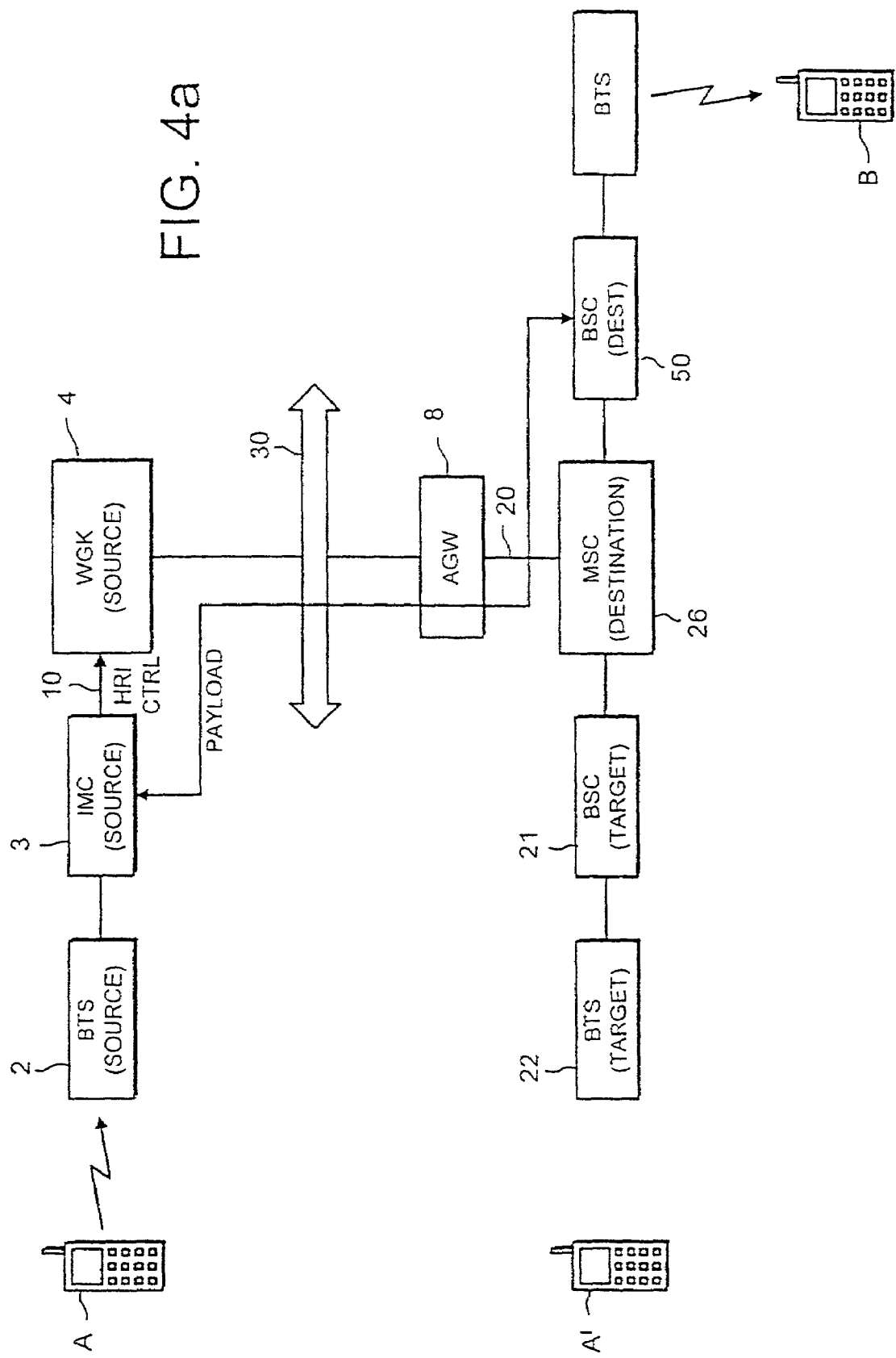

HANDOVER IN A MOBILE COMMUNICATION SYSTEM

This application is a continuation of international application serial number PCT/EP00/01078, filed 10 Feb. 2000.

BACKGROUND OF THE INVENTION

1. Field of the Invention

The present invention is related to handovers in a communication system and particularly, but not exclusively, to mobile telephone station handovers in an IP-based telecommunications network.

2. Description of the Related Art

Prior art office-based communications systems usually operate conventional fixed-line telephone units linked via an internal switchboard or PBX (private branch exchange). Such fixed-line systems are able to provide relatively high voice quality. However, user mobility is severely impaired.

The advent of digital mobile technologies such as GSM, however, means that mobile systems can now provide equivalent, if not higher, voice quality than fixed-line systems. Mobile systems also allow greater freedom of movement for the user within the office than do fixed-line systems.

WIO (Wireless Intranet Office) is a proprietary communications system developed by the applicants which introduces the concept of utilising mobile telephone units, such as conventional GSM mobile stations, in an office environment. The system makes use of a known concept called Internet Telephony or Voice-over-IP.

Voice-over-IP is a technology which allows sound, data and video information to be transmitted over existing IP-based Local or Wide Area Networks or the Internet. The technology thus provides for convergence and integration of three different media types over the same network.

Prior to the advent of Voice-over-IP, offices often operated three separate networks for the transmission of these media types. As indicated above, fixed-line telephone systems coupled to an in-house PBX provided for voice communication, an office-based LAN or Intranet (i.e. a packet-switched internal network), comprising computer terminals linked via network cards and under the control of a server station, provided for the transmission of "conventional" computer data and video cameras linked to monitors via fixed line or remote transmission link provided for video communication.

Voice-over-IP effectively combines these three media types such that they can be transmitted simultaneously on the same packet-switched network or IP-router throughout the office environment and beyond the confines of the office.

In order to provide for such media convergence, Voice-over-IP often uses a specific ITU (International Telecommunication Union) standard protocol to control the media flow over the Intranet. One common standard protocol used in Voice-over-IP systems, and the one used in the WIO system, is termed H.323.

H.323 is an ITU standard for multimedia communications (voice, video and data) and allows multimedia streaming over conventional packet-switched networks. The protocol provides for call control, multimedia management and bandwidth management for both point-to-point (2 end-users) and multipoint (3 or more end-users) conferences. H.323 also supports standard video and audio codecs (compression/decompression methods such as MPEG) and supports data sharing via the T.120 standard.

Furthermore, H.323 is network, platform and application independent allowing any H.323 compliant terminal to operate in conjunction with any other terminal.

The H.323 standard defines the use of three further command and control protocols:

a) H.245 for call control;
b) Q.931 based protocol for call signalling; and
c) The RAS (Registrations, Admissions and Status) signalling function.

The H.245 control protocol is responsible for control messages governing the operation of the H.323 terminal including capability exchanges, commands and indications. Q.931 is used to set up a connection between two terminals. RAS governs registration, admission and bandwidth functions between endpoints and gatekeepers (defined later).

For a H.323 based communication system, the standard defines four major components:

1. Terminal
2. Gateway
3. Gatekeeper
4. Multipoint Control Unit (MCU).

Terminals are the user end-points on the network, for example a telephone or fax unit or a computer terminal. All H.323 compliant terminals must support voice communications, but video and data support is optional.

Gateways connect H.323 networks to other networks or protocols. For an entirely internal communications network, i.e. with no external call facility, gateways are not required.

Gatekeepers are the control centre of the Voice-over-IP network. It is under the control of a gatekeeper that most transactions (communication between two terminals) are established. Primary functions of the gatekeeper are address translation, bandwidth management and call control to limit the number of simultaneous H.323 connections and the total bandwidth used by those connections. An H.323 "zone" is defined as the collection of all terminals, gateways and multipoint-control units (MCU—defined below) which are managed by a single gatekeeper.

Multipoint Control Units (MCU) support communications between three or more terminals. The MCU comprises a multipoint controller (MC) which performs H.245 negotiations between all terminals to determine common audio and video processing capabilities, and a multipoint processor (MP) which routes audio, video and data streams between terminals.

A conventional Voice-over-IP system described hereinabove normally utilises standard fixed-line telephone systems which are subject to the disadvantages outlined above, namely the lack of mobility and the lack of user features.

The WIO system improves on the Voice-over-IP concept in that it provides for the use of conventional mobile telephone units, such as GSM mobile stations, within the Voice-over-IP system. To provide for such mobile communications within an office-based communication network, WIO combines known Voice-over-IP, as described above, with conventional GSM-based mobile systems.

Thus, internal office calls are routed only through the office intranet and external calls are routed through both the intranet and the GSM network. Such a system provides most or all of the features supported by the mobile stations and the GSM network such as telephone directories, short messaging, multiparty services, data calls, call barring, call forwarding etc. WIO, therefore, provides for integrated voice, video and data communications by interfacing an H.323-based voice-over-IP network with a GSM mobile network.

The WIO system is a cellular network, similar to the conventional GSM network and is divided into H.323 Zones, defined in more detail later. One H.323 Zone may comprise a number of cells.

Given the cellular nature of the WIO system, a major issue to be addressed is that of handovers. As a mobile station moves from cell to cell it reports its location to the BTS or equivalent controller. When it moves from one zone to another, a handover is needed to a different gateway. A similar consideration applies to mobile stations in the conventional GSM network.

In such conventional GSM systems, the need for a handover of a mobile station to a different cell of the network is normally determined by a number of parameters but predominantly including the mobile station measuring the strength of signals transmitted from several base transceiver stations.

Similarly, a mobile station operating in the WIO system is able to compare the signal strengths of the signals received by several base stations, in different cells, in the network.

However, added complexities arise in the WIO system since a mobile unit operating within such a system is not only able to move between cells within the system, but also between zones and even between the system itself and an external GSM network.

It can be seen, therefore, that there are several different types of handovers which may need to be executed in the normal operation of a WIO system. These types of handovers are:

a) The handover of a mobile from one WIO cell to another whilst engaged in a call.
b) The handover of a mobile from one WIO zone to another whilst engaged in a call.
c) The handover of a mobile from a cell within the WIO system to a cell within an external GSM system.
d) The handover from a cell within an external GSM system to a cell within the WIO system.

SUMMARY OF THE INVENTION

According to one aspect of the present invention, therefore, there is provided a method of effecting handoff of a call in which at least one mobile station is engaged in a cellular communications network comprising a plurality of cells, the method comprising: receiving from said mobile station a handoff required indication indicating that handover is needed from a source gateway to a target gateway; formulating at the source gateway a packet addressed to a source gatekeeper, said packet including control information comprising a candidate list identifying possible alternative gateways; and at the source gatekeeper, determining to which of said target gateways a handoff request should be forwarded and formulating a packet for forwarding to said target gateway.

According to another aspect of the present invention there is provided a cellular communications network comprising: a plurality of gateways for controlling cells in the cellular communications network, the gateways being arranged to receive RF information from at least one mobile station in the network, at least one gatekeeper connected to said gateways by a switched packet communication path, wherein each gateway includes means for generating a handover required indication for a call in which the gateway is engaged and packet generating means for generating a packet addressed to said gatekeeper and including control information comprising a candidate list of alternative cells to which the call could possibly be transferred and wherein the gatekeeper includes packet generating means for generating a packet for sending a handover request for handing over the call to one of said alternative cells.

According to one embodiment of the invention, the gateways required to implement handover are all under the control of a common gatekeeper. In a WIO network as defined earlier, this means that the handover is performed inside one H.323 zone, which means that the handover is controller by one gatekeeper (acting as a central controller). The gatekeeper uses the control information which is receives from the source gateway to determine to which target gateway the ongoing call should be requested to be handed over. Control information includes a wireless network specific list of addressable candidate cells from which the target gateways can be resolved, and may additionally include some additional wireless network specific data.

A first embodiment is termed herein an intra-zone handover.

According to a second embodiment, the cellular communications network comprises at least two gatekeepers connected via the switch packet communication path. Each gatekeeper controls a set of gateways to define respective network zones. The second embodiment allows an inter-zone handover to be defined. In this case, the handover is performed between two zones, which means that the handover is controlled by two gatekeepers. The controlling gatekeepers in this type of handover are different for both the source and target gateways. The gatekeeper which controls the source gateway (the source gatekeeper) decides by using the control information forwarded by the source gateway to which target gateway the ongoing call should be handed over.

According to the second embodiment, the candidate list thus includes addressable candidates for the target gateways with additional information on the target gatekeeper.

According to a third embodiment, the cellular communications network is an internal network and the gatekeeper is connected to an external controller of an external network via said switched packet communication path.

For example the external network could be a standard GSM network, with the external controller being the mobile switching centre for the GSM network.

In accordance with the third embodiment, where the destination mobile station lies in the external network, when the source gateway indicates that a handover is required, and the source gatekeeper cannot find in the candidate list a suitable candidate within that zone or other known zones, while at least one candidate is in the external cellular network, the source gatekeeper forwards the handoff required indication to the external controller, having deleted from the candidate list the candidates which were unsuccessfully tried.

According to a fourth embodiment, an improvement is provided wherein the packet generated by the gateway additionally includes data defining network specific resources, for example of a different network to which a call is to be handed over. According to the above described first embodiment, when a hand over is required for a mobile station, a preferred list of candidates for the target gateway (or interfacing equipment) is provided by the source gateway. From this list, the gatekeeper may choose a candidate and request that the ongoing call is handed over to this target. Information on the network specific resources is, according to a third embodiment, included in the handoff request sent by the source gateway. By including this information in the handoff request, the source gatekeeper does not have to have any knowledge about the network configuration.

For example, where the network to be handed off to is a GSM system, the network specific resources can define radio resources, for example a target cell identifier. This means that the gatekeeper does not need to have a target cell identifier to target network address resolution functions.

The data defining network specific resources can be GSM system specific and system information, such as GSM mobile station class mark and call encryption information. This information may be held at a gateway.

According to a fifth embodiment, an anchor central controller is defined through which all handoff request are routed.

For a better understanding of the present invention, and to show how the same may be carried into effect, the present invention will now be described in more detail with reference to the accompanying drawings in which:

BRIEF DESCRIPTION OF THE DRAWINGS

FIG. 3b is a block diagram illustrating the communication pathways used during a handover according to a second embodiment of the invention;

FIG. 4a is a block diagram illustrating the communication pathways used before a handover according to a third embodiment of the invention;

DETAILED DESCRIPTION OF THE PREFERRED EMBODIMENTS

Figure 1A:
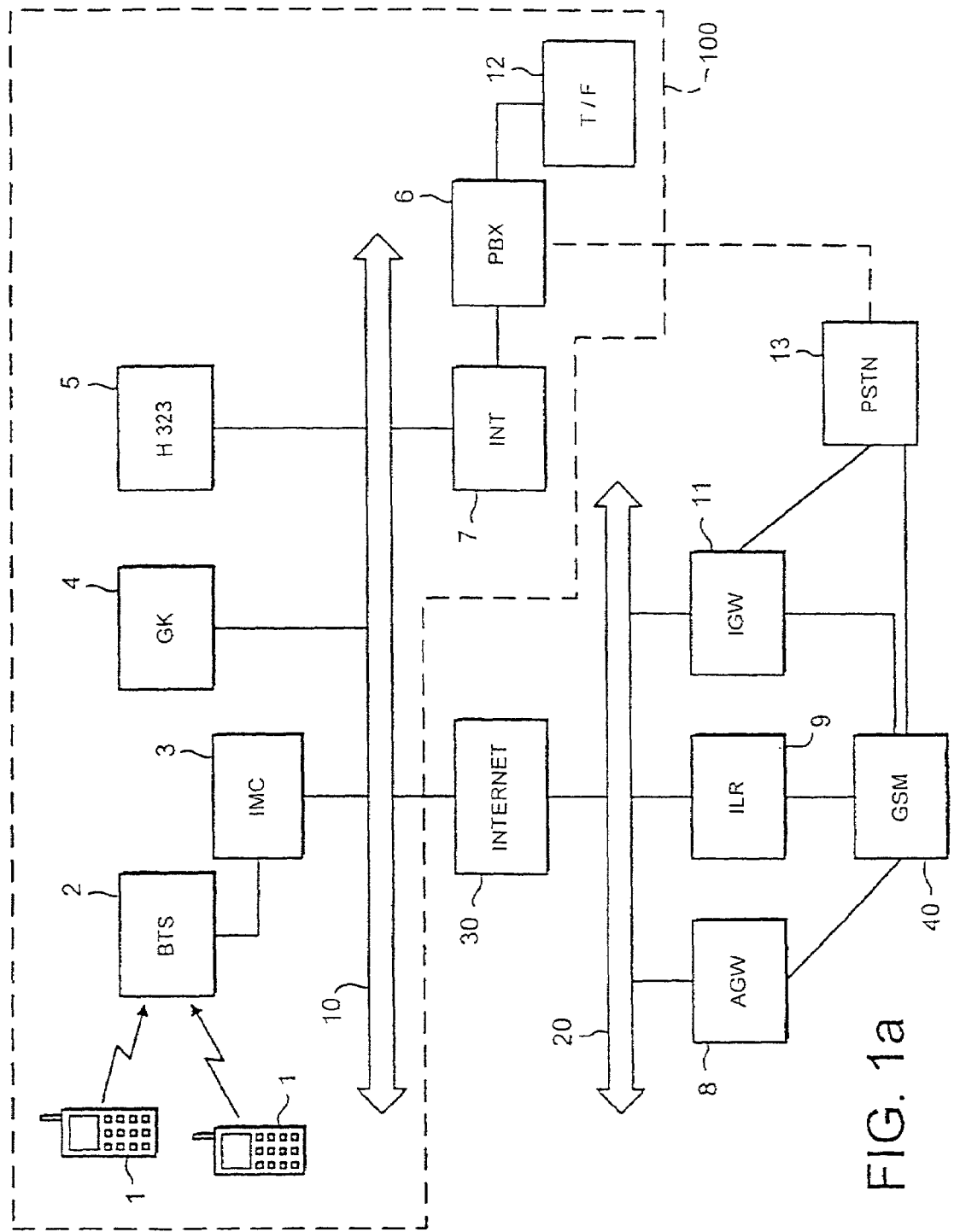
FIG. 1a is a block diagram showing some of the components used in the implementation of a WIO system.

Reference is first made to FIG. 1a to describe the context of this invention.

A WIO system can be provided in an office and operator environment based on an IP (Internal Protocol) based packet network. In practice there are two Local Area Networks (LANs) or Intranets which are operable to carry standard packet-switched data. These are connected via, e.g., a wide area network (WAN). An IP (Internet Protocol) router 10 can be used in the LAN environment as can an IP switch or hub. The office environment is denoted by a dashed box 100.

One or more mobile stations (MS) 1 communicate, i.e. transmit signals to and/or receive signals from, a base transceiver station (BTS) 2. The base transceiver station 2 used in the WIO system is similar to base transceiver stations used in conventional GSM mobile communications systems in that it is connected to, and operates in conjunction with, a controller. In a conventional GSM system, the controller is termed a base station controller (BSC); in WIO, however, the controller is represented by an Intranet Mobile Cluster interface (IMC) 3, the function of which will be described later. Also, some of the functions of a conventional BSC are located in an A-interface gateway 8 or WIO gatekeeper 4.

The base transceiver station 2, therefore, receives signals transmitted by the mobile unit 1 and forwards them to the Intranet Mobile Cluster interface 3. The Intranet Mobile Cluster interface 3 is also connected to the IP-router 10.

A WIO Gatekeeper (WGK) 4 is connected to the IP-router 10 as is an H.323 terminal (H.323) 5. The H.323 terminal 5 may be represented by a computer terminal which supports voice information on an H.323 application.

One or more telephone or facsimile units (T/F) 12 are connected to a private branch exchange (PBX) 6 as in a conventional fixed-line office communication system. The private branch exchange 6 is connected to the IP-router 10 via an interface (INT) 7. The private branch exchange 6 is additionally connected to a Public Switched Telephone Network (PSTN) 13 such as a conventional BT network.

The IP-router 10 is connected to an external IP-based network 30, such as a Wide Area Network (WAN) or the Internet.

For extra-office communication, the P-based network 30 is connected to a second IP-router 20, on the operator side, which may also be represented by a LAN or Intranet.

Connected to the second IP-router are two interfaces, an A-interface gateway (AGW) 8 and an ISDN gateway (IGW) 11, and an intranet location register (ILR) 9. The AGW 8, ISDN gateway 11 and Intranet location register 9 are also connected to a standard GSM network as used in a conventional mobile communications system. The ISDN gateway is additionally connected to the Public Switched Telephone Network (PSTN) 13.

The functions of each of the components of FIG. 1a will now be described in more detail.

The Intranet Mobile Cluster interface 3 performs similar functions to that of a base station controller in a conventional GSM network such as the management of radio resources and channel configuration and the handling of the base transceiver station configuration. However, the intranet mobile cluster interface also provides signal conversion from a GSM time-slot format to a packet-based format suitable for transmitting on the IP-router 10.

During a call, therefore, the intranet mobile cluster interface 3 converts the time-slot format signal transmitted by the base station into a packet-based format suitable for transmitting on the IP Router 10.

The WIO gatekeeper 4 is the main controller of the WIO system and has a high processing capability. Its function is to provide control services to the IP Router and the various user terminals. However, the Gatekeeper is also responsible for all of the functions which the H.323 protocol defines to its gatekeeper, including call management and call signalling. The WIO Gatekeeper is able to manage the main different call types such as voice, data, facsimile and conference calls which can be established between a mobile station, a PC terminal and a normal telephone in any combination. The gatekeeper is analogous to the mobile switching centre 26 in a conventional GSM network.

The A-interface gateway 8 handles communication between the WIO environment and the GSM network via the mobile services switching centre 26 (MSC—see FIG. 4).

From the main switching centre's viewpoint, the WIO appears to be a conventional base station controller. The A-interface gateway 8 also provides an interface for an Operations and Maintenance Unit (O&M—not shown).

The ISDN gateway (IGW) 11 handles communication between the WIO environment and the public telephone network and has an interface to both the mobile switching centre 26 and the PSTN 13. The ISDN gateway 11 is used to enable communication mainly between a non-GSM H.323 terminal and either a GSM mobile unit outside the WIO network or an external fixed-line telephone. It also provides for the possibility of communication from a mobile station to a PC. Only GSM mobile stations can be connected to the mobile switching centre 26 via the A-interface gateway 8. The WIO Gatekeeper controls the status of the ISDN gateway 11 and sends the information to the O&M unit.

The intranet location register 9 provides the directory services in the WIO system. The purpose of the directory service is to provide storage for mobile station-specific information, such as mobile station identities, corresponding network addresses, GSM classmark and encryption information, for use in the WIO system. All of the mobile stations within the WIO system have an entry in the intranet location register. The WIO Gatekeeper initiates the current intranet location register entry of each mobile station allowing the correct mobile number to be accessed in each call. The intranet location register is linked to the home and/or visitor location register (not shown) within the GSM network via a mobile application part (MAP) interface (not shown).

The telephone calls handled by the WIO system can be divided into internal calls and external calls. Internal calls are those calls where the mobile station and the other terminal involved in the call are located within the WIO system, and external calls involve a mobile station or other terminal which is not located within the WIO system. Calls may also be between H.323 terminals and external PSTN subscribers.

Figure 1B:
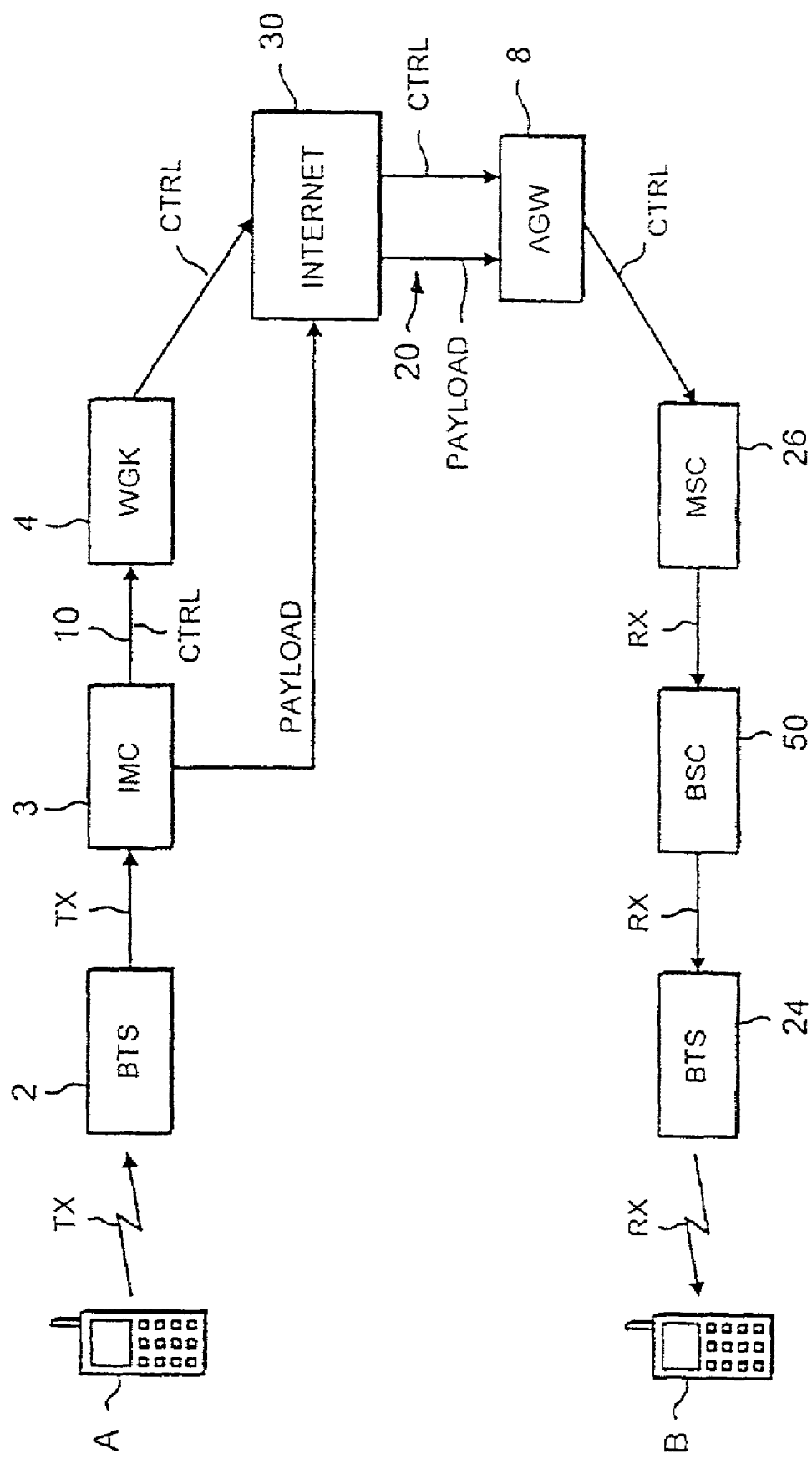
FIG. 1b is a block diagram illustrating the communication pathways used during a call between an internal mobile station and an external mobile station.

The functions of the WIO system components described above will now be described with reference to FIG. 1b in the context of a telephone call from a mobile station located within the WIO system (mobile A) to a mobile station located in an external network such as a GSM network (mobile B).

The mobile station A transmits a radio frequency (RF) transmission signal TX, on a predetermined communication channel, to the base transceiver station 2 in a format conventional to GSM communications systems such as a timeslot format. The communication channel on which the mobile station A transmits the RF transmission signal is determined in a manner conventional to GSM communication systems.

The base transceiver station 2 receives the RF transmission signal, down-converts it and then forwards it to the intranet mobile cluster interface 3. In this respect, the base transceiver station 2 and the intranet mobile cluster interface 3 operate in a manner similar to a base transceiver station and a base station controller respectively in a conventional GSM network.

The intranet mobile cluster interface 3 receives the down-converted transmission signal from the base transceiver station 2 and converts the voice data from the conventional GSM time-slot format, to a packet-based format which allows it to be transmitted along the IP-router 10. This is referred to herein as the PAYLOAD. Also, the intranet mobile cluster interface 3 composes a control signal CTRL containing call signalling messages, for example identification of the destination MS B, the IP address corresponding to that MS and/or identification of the source MS A.

The control signal CTRL is then routed, in packet format, via the IP-router 10, to the gatekeeper 4 which, based on the information contained in the control signal CTRL, determines whether the mobile station B is located within the WIO system or external to the WIO system. If the mobile station B lies outside the WIO system, e.g. a conventional GSM mobile unit operating in the GSM network, the gatekeeper 4 causes the control signal CTRL and the payload signal PAYLOAD to be routed along the IP-router 10 to the second IP-router 20 via the external network 30.

The payload signal PAYLOAD, still in packet format, is transmitted from the second IP-router 20 to the A-intranet gateway 8. The A-intranet gateway converts the payload signal from the packet-based format used to transmit it on the IP-routers and Internet (10, 20, 30) into a conventional GSM format such as a time-slot format.

The receive signal RX, in timeslot format, is forwarded from the A-interface gateway 8 to the Mobile Services switching centre 26 (MSC) in the GSM Network from where it is transmitted to the respective Base Station Controller/Base transceiver station 24, under which the mobile station B is operating, in a manner conventional to GSM.

Figure 1C:
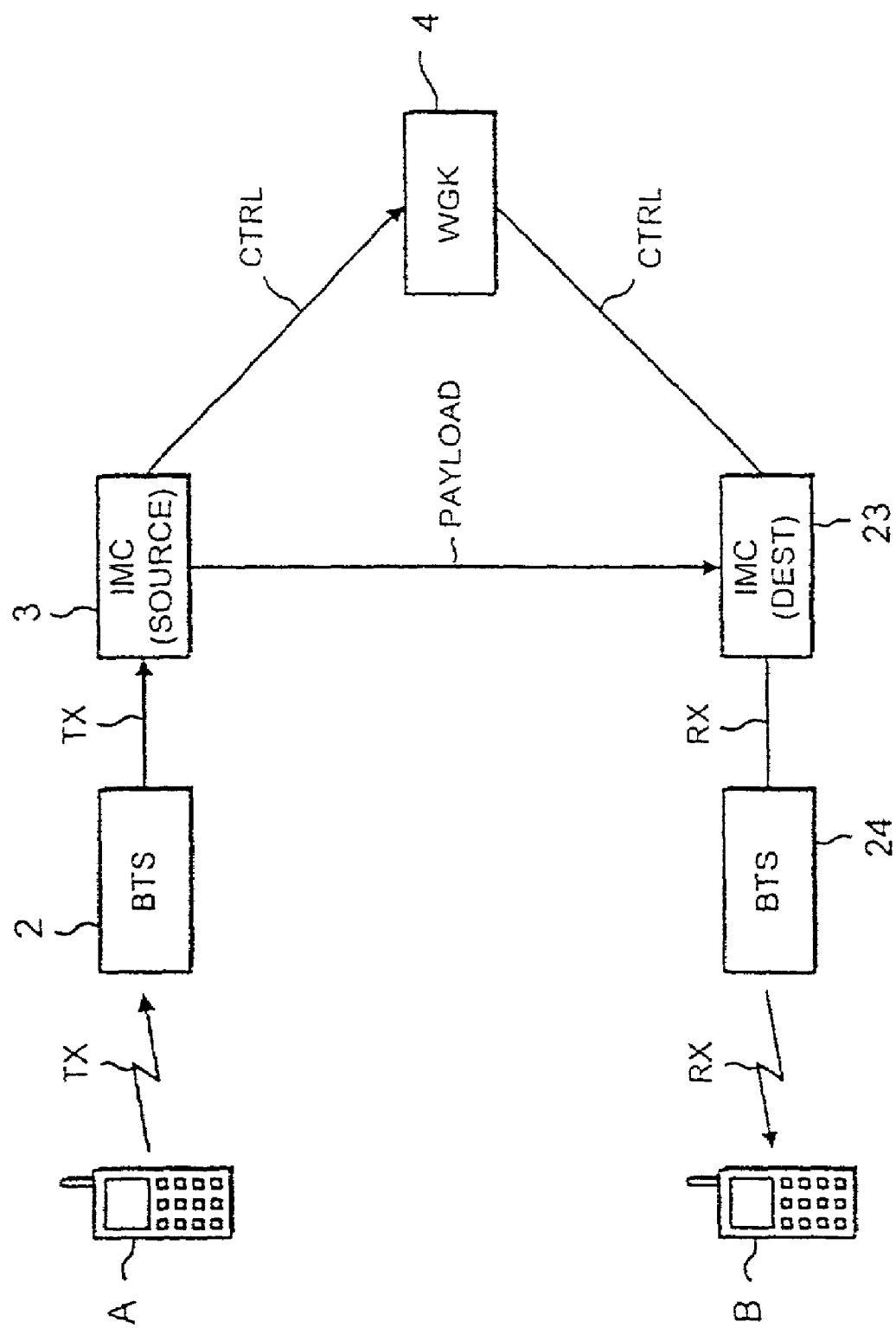
FIG. 1c is a block diagram illustrating the communication pathways used during a call between two internal mobile stations operating under the same gatekeeper.

Calls which are completely internal to the WIO system are handled slightly differently as shown in FIG. 1c. The RF transmission signal TX, in timeslot format, transmitted by the mobile A is again sent to the BTS 2 which performs down conversion of the signal. The down-converted signal is forwarded to the intranet mobile cluster interface 3 which performs format conversion to generate a PAYLOAD packet and a CTRL packet.

From the intranet mobile cluster interface 3, the control signal CTRL is sent to the Gatekeeper 4 which determines if the mobile station B is within the WIO system and, if so, in which H.323 Zone it is located. A H.323 zone is defined as the collection of all terminals, gateways and multipoint control units managed by a single gatekeeper.

If the mobile station B is operating in the same H.323 Zone as the mobile station A, i.e. under the same Gatekeeper which then starts the paging procedure, the Gatekeeper 4 will receive a paging response from the destination intranet mobile cluster interface 23, i.e. the intranet mobile cluster interface under which the mobile station B is operating, and then routes the payload along the IP-router 10 to that destination intranet mobile cluster interface.

The destination intranet mobile cluster interface 23 converts the payload signal into a timeslot format. It is then sent, via its base transceiver station 24 which performs upconversion to RF, to the mobile station B.

Figure 1D:
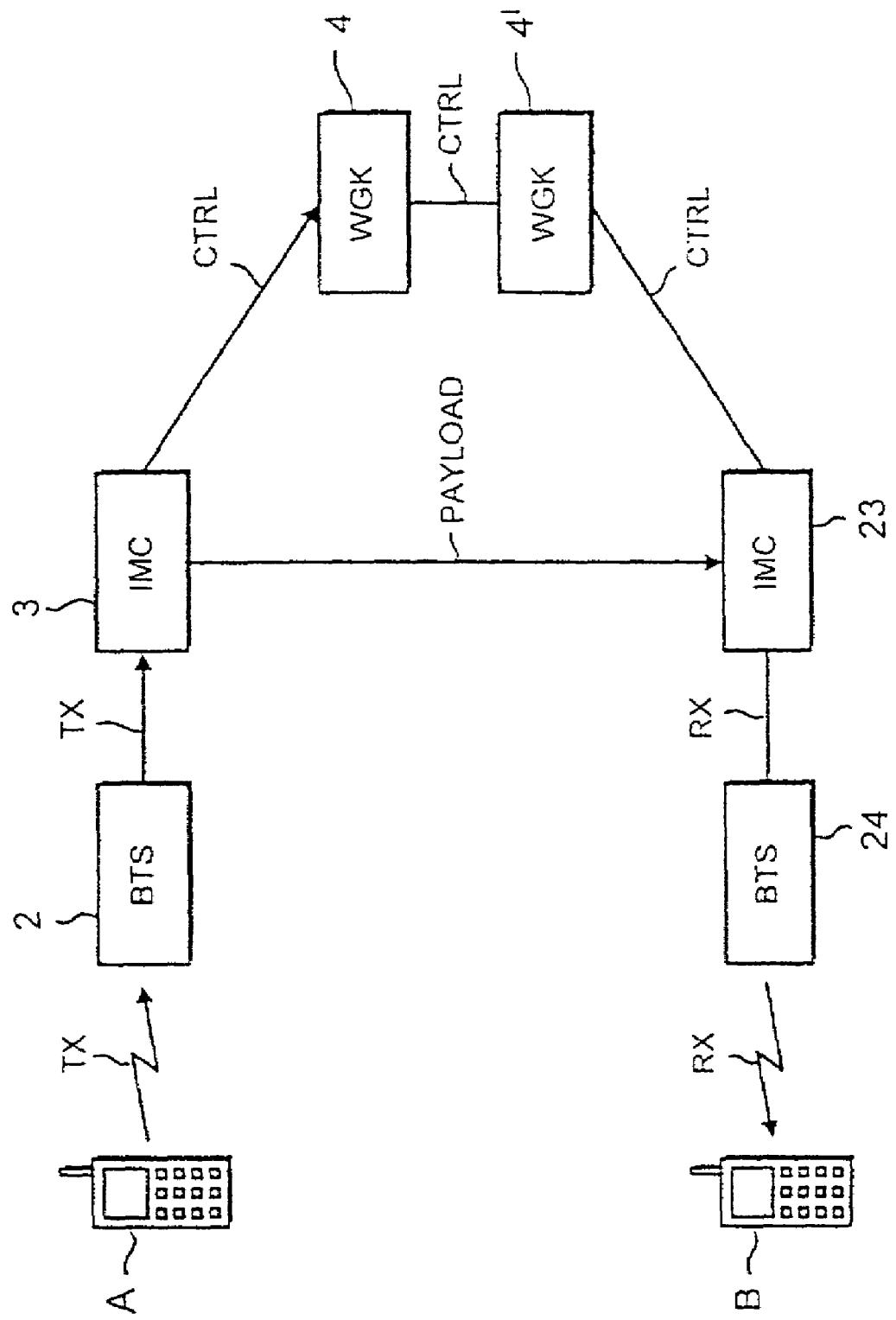
FIG. 1d is a block diagram illustrating the communication pathways used during a call between two internal mobile stations operating under different gatekeepers.

As shown in FIG. 1d, if the gatekeeper 4 determines that the mobile station B is in a different H.323 Zone to the mobile station A, the gatekeepers routes the payload signal to the destination gatekeeper 4', i.e. the gatekeeper under which the mobile station B is operating. If the destination gatekeeper receives a paging response from one of the intranet mobile cluster interfaces, it then routes the call signal to the intranet mobile cluster interface and out to the mobile station B, via its base transceiver station 24, in a manner similar to that described above.

Figure 2A:
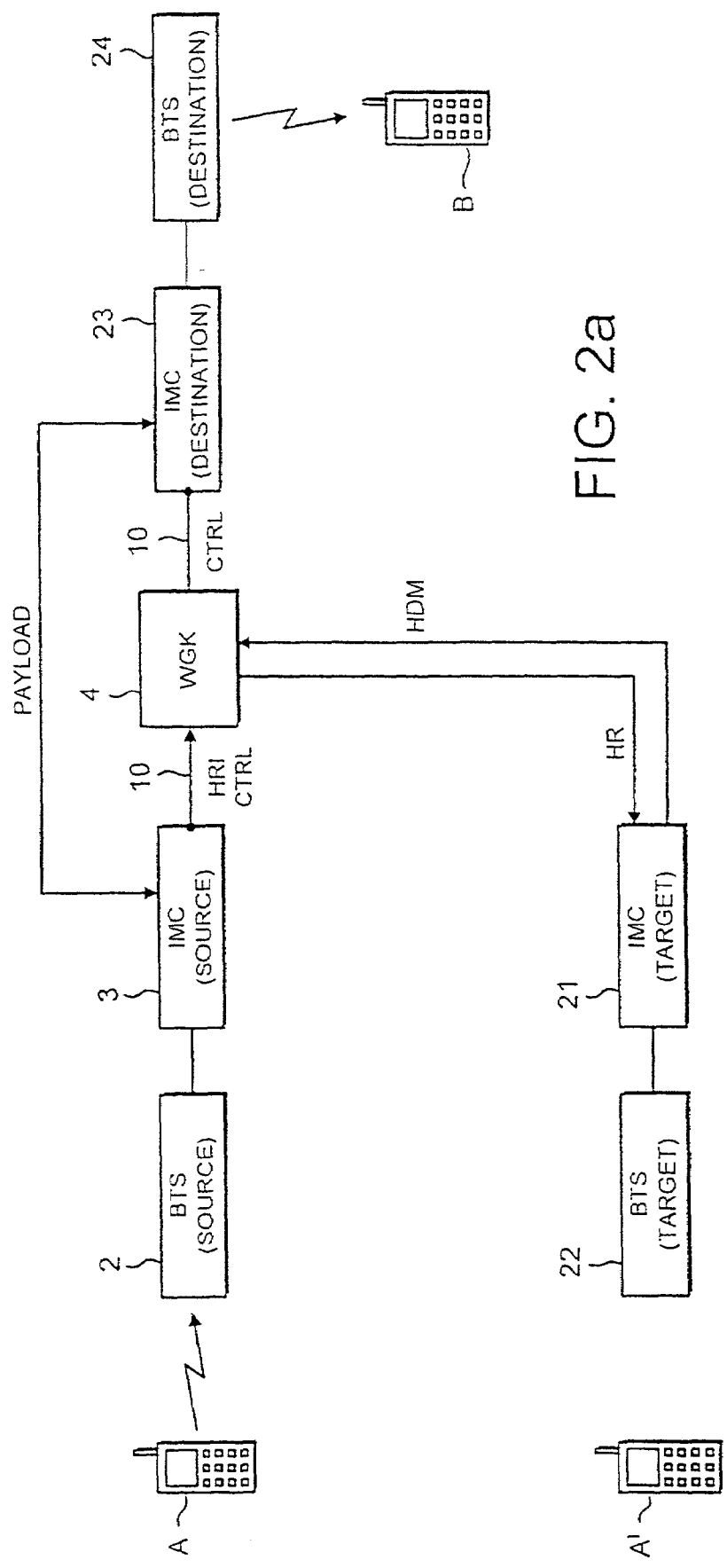
FIG. 2a is a block diagram illustrating the communication pathways used before a handover according to a first embodiment of the invention.

Referring to FIG. 2a, in the context of handovers in the WIO system, a cell from which a mobile station A is handed over is termed a "source" cell. A cell to which a mobile station is handed over is termed a "target" cell. The MS is labelled A' after its handover. Accordingly, components within the source cell (such as terminals, gateways etc.) are termed source components and components within the target cell are termed target components. The cell in which the other mobile station B is located is termed the destination cell and components therein are termed destination components.

Figure 2B:
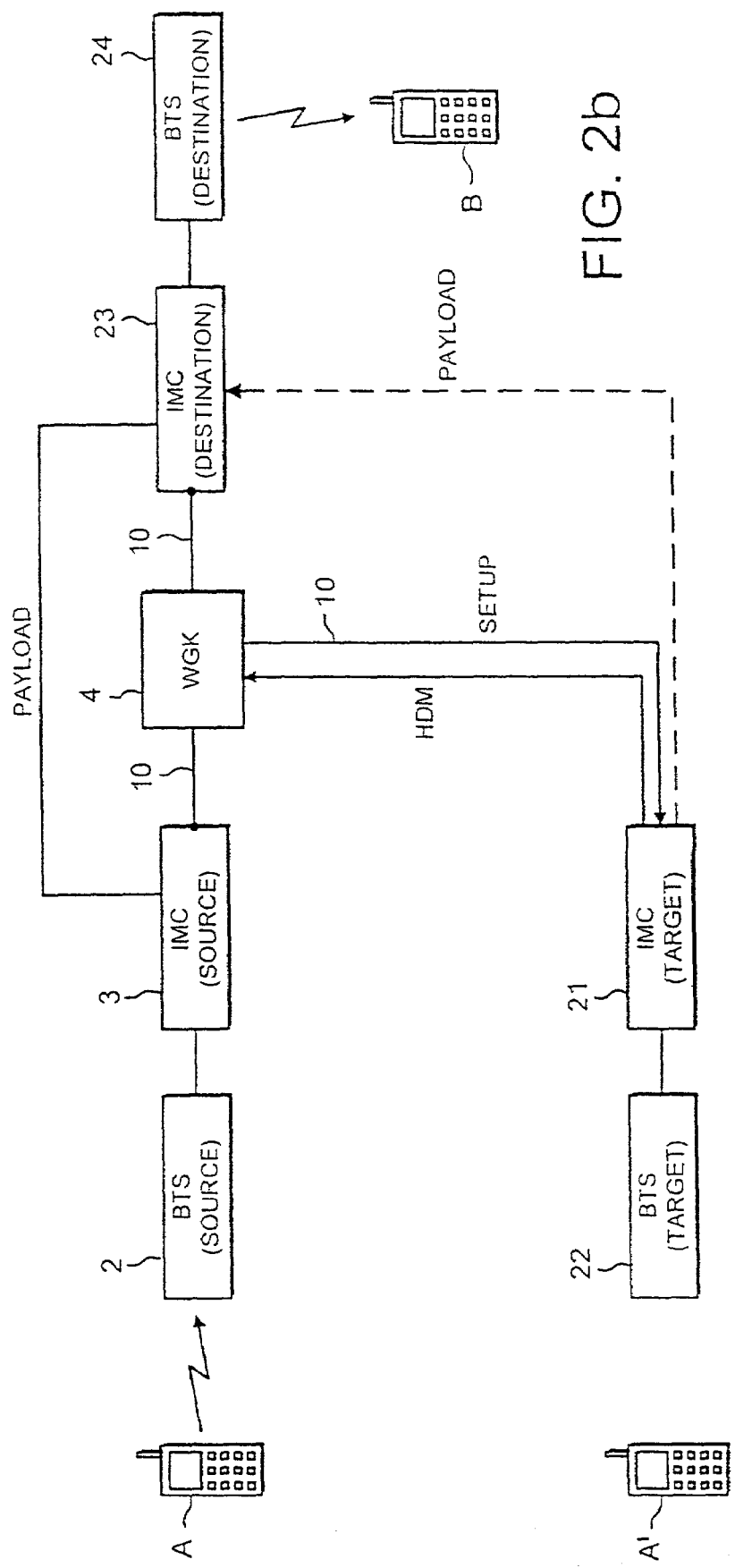
FIG. 2b is a block diagram illustrating the communication pathways used during a handover according to a first embodiment of the invention.
Figure 2C:
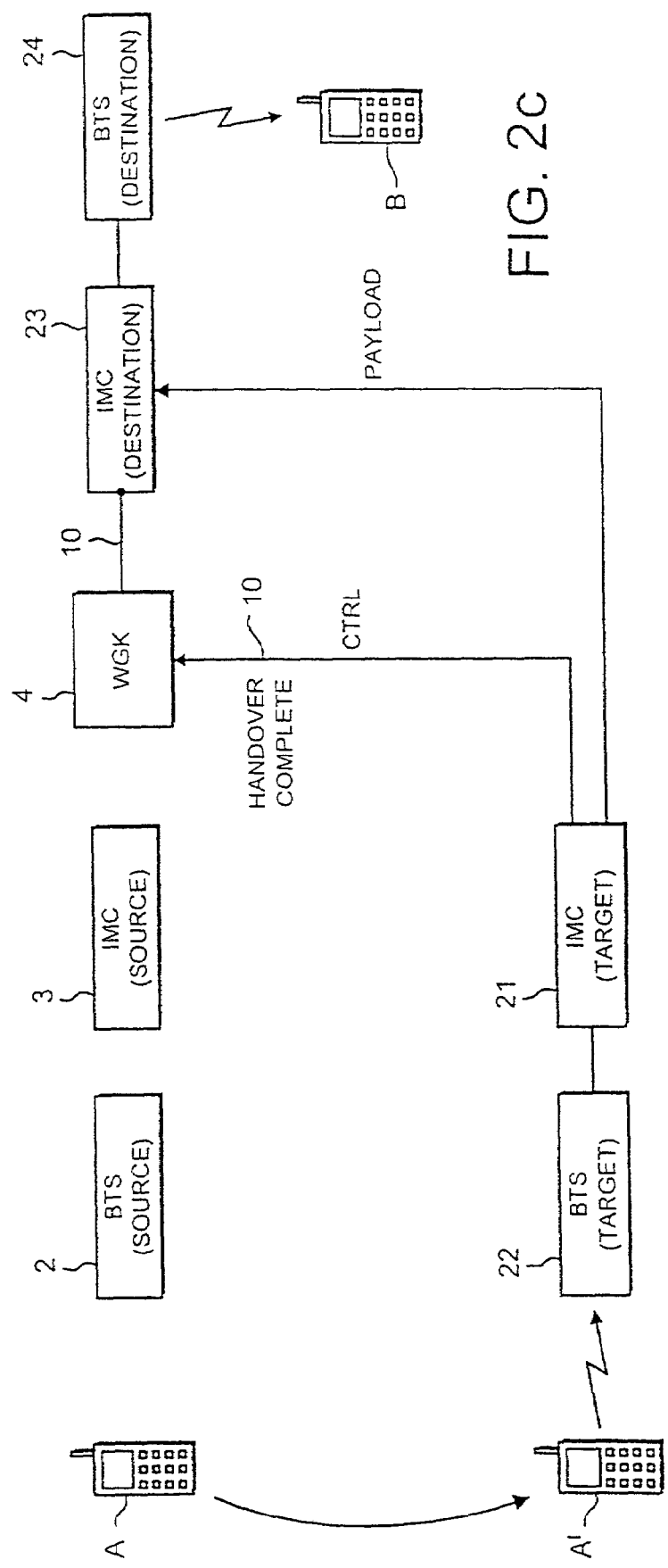
FIG. 2c is a block diagram illustrating the communication pathways used after a handover according to a first embodiment of the invention.

Referring to FIGS. 2a, 2b and 2c, the first embodiment of the present invention concerns a so-called "intra-H.323 zone" handover, i.e. the handover of a mobile station from a first cell to a second cell within the same WIO H.323 zone. In this instance, it is clear that the components of the source cell and the components of the target cell are under the control of the same gatekeeper, i.e. the source gatekeeper 4 and the target gatekeeper 25 are the same entity.

During the time that it is in a particular cell, the mobile station continuously receives signals from several base transceiver stations in adjacent cells. It sends the measurement reports to the IMC which makes a decision when handover is needed. If the level of a signal transmitted by a base transceiver station, located in a different cell from that of the mobile, reaches a certain threshold level T1 in relation to that of the base transceiver station located in the mobile station's current cell, the IMC may determine that a handover to that cell is required and will issue a handover required indication to the network controller. The issuance of such a handover request is, however, subject to other mobile station specific parameters all of which are known in GSM.

Thus, in FIG. 2a, the IMC determines that a handover of MS A to an adjacent cell is required in accordance with this procedure. When threshold level T1 is reached, subject to any other overriding parameters, the IMC generates a handover required indication HRI as a packet-based message signal suitable for transmitting on the IP-router. The source intranet mobile cluster interface 3 also generates, in packet form, a control and signalling message CTRL containing control and signalling data.

The gatekeeper 4 which controls the handover is provided by the HRI with a candidate list which is a list of cell identifiers (i.e. Local Area Code and cell identifier) which the gatekeeper resolves into a choice of target gateways.

In addition, the gatekeeper holds GSM Classmark identification for the mobile station as well as encryption information.

The source intranet mobile cluster interface 3 transmits the handover required indication HRI to the gatekeeper.

The gatekeeper receives the handover required indication (HRI) message from the source intranet mobile cluster interface 3. As described above, within the HRI message there is a list of cell identifiers for potential target intranet mobile cluster interfaces 21 to which the call could be handed over (the candidate list). The target IMC 21 is associated with a BTS 22.

From the candidate list, the gatekeeper selects the first target intranet mobile cluster interface 21 on the list and generates and forwards a handover request HR message to it. In this manner, the gatekeeper asks whether or not the call to the mobile station A may be handed over to the intranet mobile cluster interface.

In the event that the first target intranet mobile cluster interface 21 is unable to accept the handover (for example, for reasons of traffic congestion), it sends a signal to the gatekeeper indicating its rejection of the handover request.

If, however, the target intranet mobile cluster interface 21 accepts the handover request, it sends a handover request acknowledge HRA message to the gatekeeper. The gatekeeper then begins to set up the appropriate communications links between the target IMC and the destination IMC, in which MS B is operating (FIG. 2b). This is illustrated as destination IMC 23 and destination BTS 24.

Once the communications links between the target IMC and the destination cell have been set up, the gatekeeper sends a message to the source intranet mobile cluster interface 3 instructing it to execute the handover of the payload to the target IMC 21. In FIG. 2b, the existing call for the payload is denoted by a solid line, and the call to be set up is denoted by a dotted line.

The target IMC sends a handover detect message when it recognises that MS A' is connected to it. Handover execution continues and if the handover of the mobile station to the target cell is performed successfully, the target intranet mobile cluster interface 21 sends a handover complete message to the gatekeeper. Neither the handover detect message nor the handover complete message are forwarded to the source IMC.

Upon receiving the handover complete message from the target intranet mobile cluster interface 21, the gatekeeper then disconnects the communications links from the source intranet mobile cluster interface 3 (FIG. 2c).

Figure 3A:
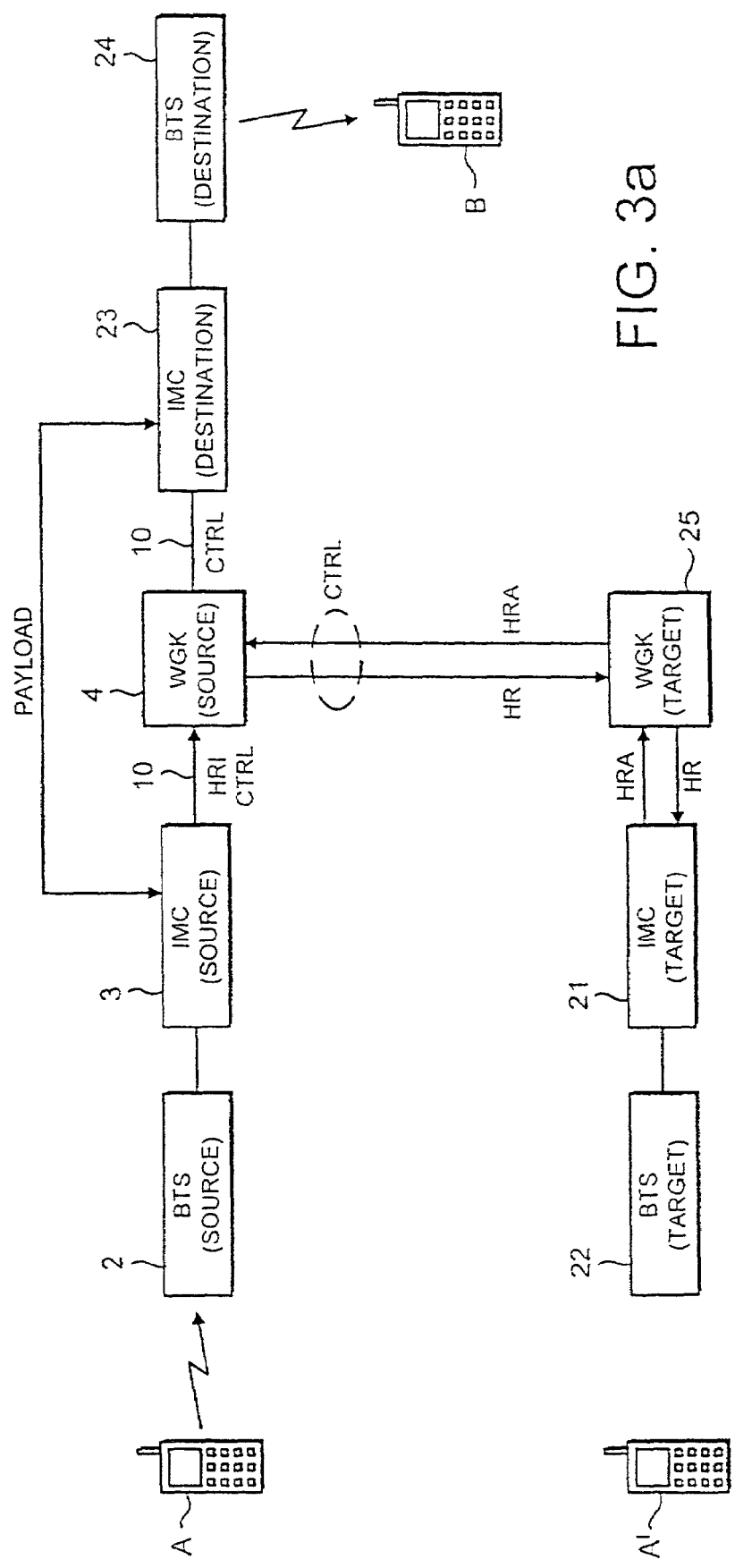
FIG. 3a is a block diagram illustrating the communication pathways used before a handover according to a second embodiment of the invention.
Figure 3C:
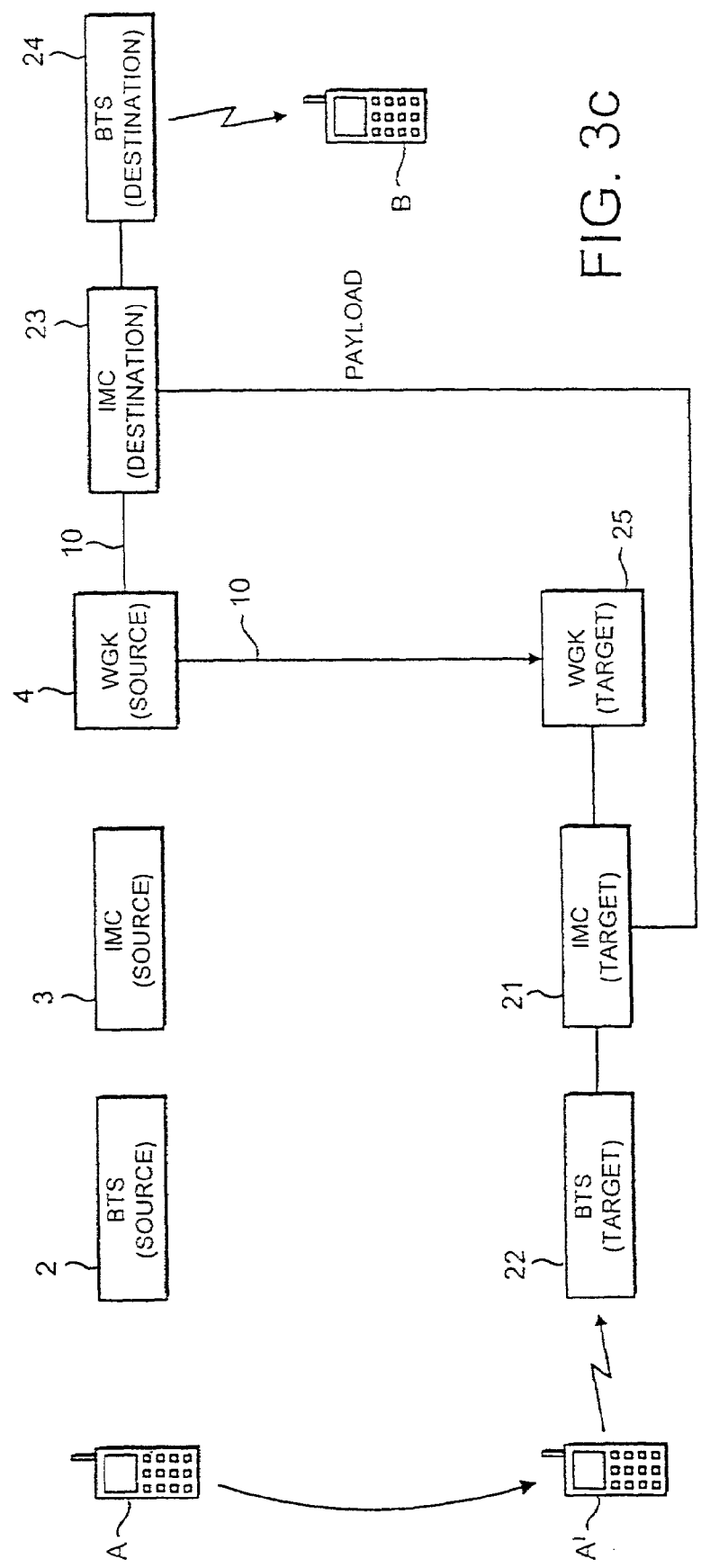
FIG. 3c is a block diagram illustrating the communication pathways used after a handover according to a second embodiment of the invention.

Referring to FIGS. 3a, 3b and 3c, a second embodiment of the present invention concerns a so-called "inter-H.323 zone" handover, i.e. the handover of a mobile station from a first cell to a second cell in a different WIO H.323 zone. In this instance, the components of the source cell and the components of the target cell are under the control of different gatekeepers, i.e. the source gatekeeper 4 and the target gatekeeper 25 are not the same entity.

The source IMC 3 determines that a handover to an adjacent cell is required in accordance with the procedure described above. When threshold level T1 is reached, subject to any other overriding parameters, the source IMC 3 issues a handover required indication HRI as a packet-based message signal suitable for transmitting on the IP-router. The source intranet mobile cluster interface 3 also generates, in packet form, a control and signalling message.

The source intranet mobile cluster interface 3 transmits the handover required indication and the control and signalling message to its gatekeeper (the source gatekeeper 4).

The source gatekeeper 4 receives the HRI message from the source intranet mobile cluster interface 3. As described above, within the HRI message generated by the source intranet mobile cluster interface 3, there is a list of call identifiers for potential target intranet mobile cluster interfaces 21 to which the call could be handed over (the candidate list).

In this embodiment, the target intranet mobile cluster interfaces 21 identified in the candidate list are not located in the same H.323 zone as the source intranet mobile cluster interface 3. Thus the target intranet mobile cluster interface 21 is controlled by a target gatekeeper 25.

From the candidate list, the source gatekeeper 4 selects the first target intranet mobile cluster interface 21 on the list and forwards a handover request (HR) message to the target gatekeeper 25. Information regarding the address of the gatekeeper controlling the selected target intranet mobile cluster interface 21 is contained in the candidate list.

The target gatekeeper 25 then forwards the handover request (HR) message to the target intranet mobile cluster interface 21. If the target intranet mobile cluster interface is able to accept the handover, it sends a handover request acknowledge (HRA) signal to the target gatekeeper 25. The target gatekeeper 25 then sends the handover request acknowledge to the source gatekeeper 4.

On receiving the HRA message, the source gatekeeper 4 begins to set up the appropriate communications links between the target cell and the destination cell.

Once the appropriate communications links have been set up, the source gatekeeper 4 instructs the source intranet mobile cluster interface 3 to execute the handover (FIG. 3b).

If the handover is successfully performed, the target intranet mobile cluster interface 21 sends a handover detect (HDM) and handover complete message to the source gatekeeper 4 via the target gatekeeper 25. The source gatekeeper 4 then disconnects the existing communications links between the source cell and the destination cell (FIG. 3c).

Figure 4B:
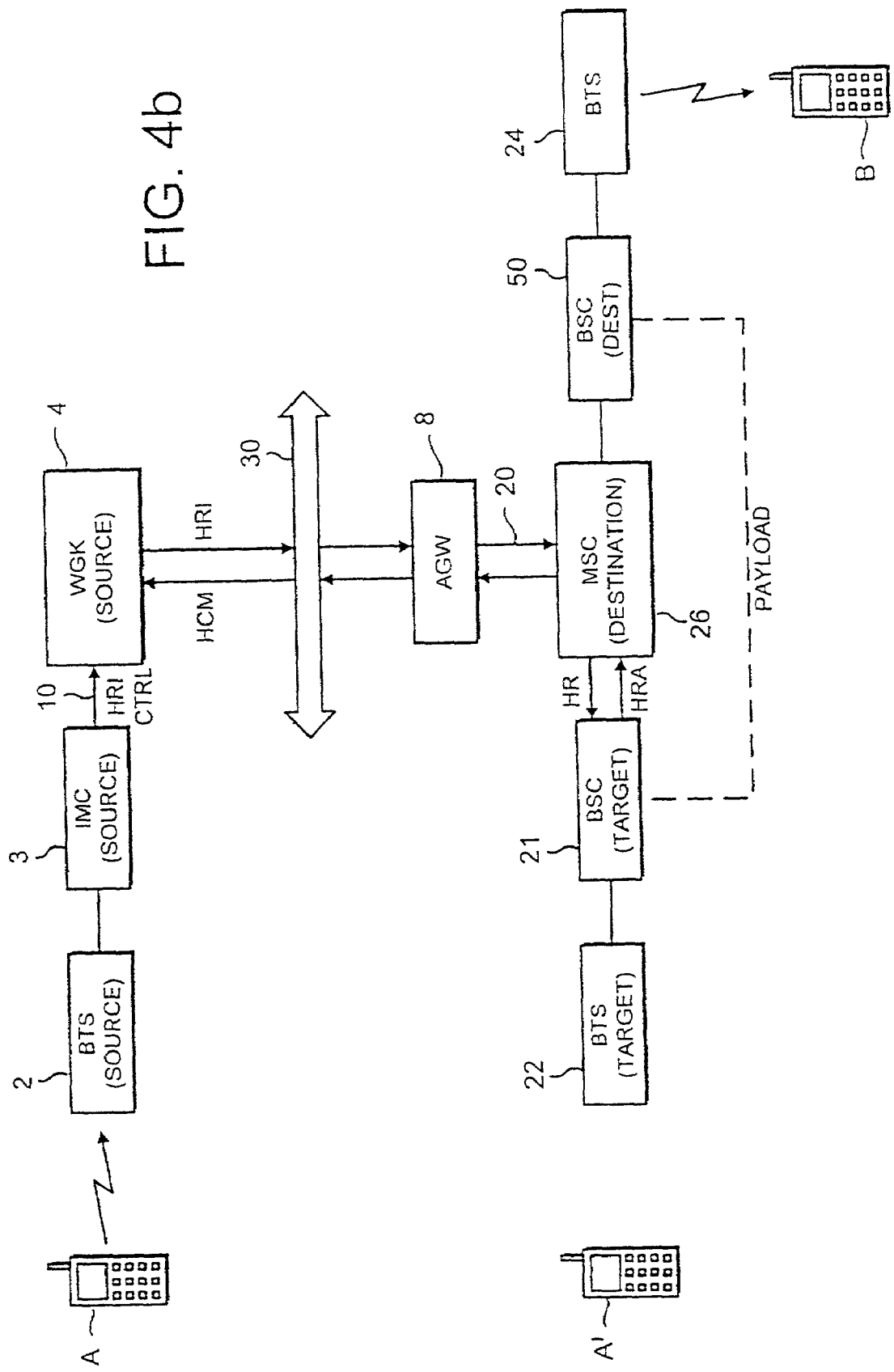
FIG. 4b is a block diagram illustrating the communication pathways used during a handover according to a third embodiment of the invention.
Figure 4C:
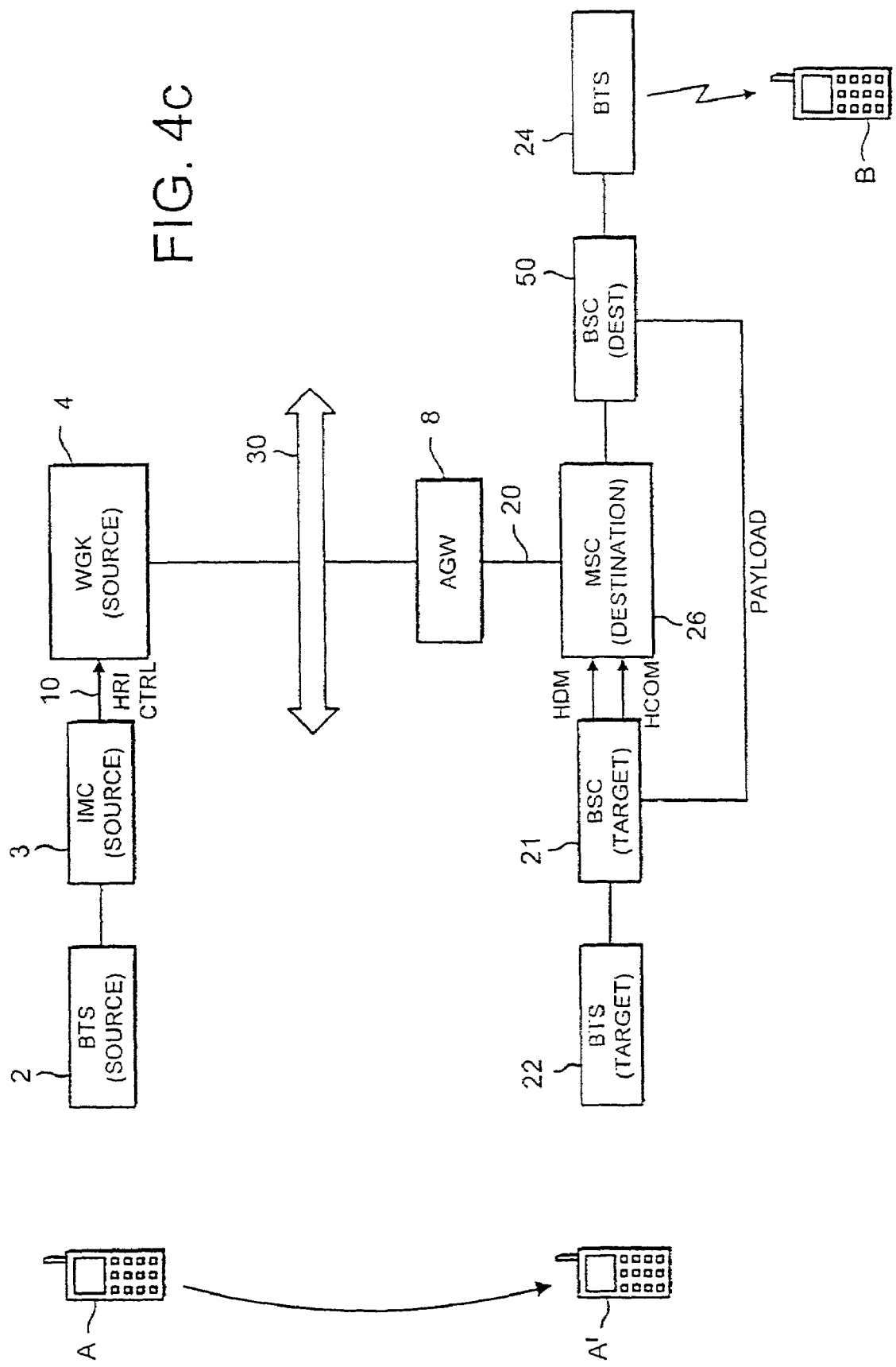
FIG. 4c is a block diagram illustrating the communication pathways used after a handover according to a third embodiment of the invention.

Referring to FIGS. 4a, 4b and 4c, another embodiment of the present invention relates to a so-called "external source-side/target-side handover", i.e. the handover of a call from a first cell of the WIO network to a second cell in an external communications network such as a GSM mobile network, while the destination mobile station B is in the external network. The reverse handover from a cell in an external communications network to a cell in the WIO network is also possible. In this instance, the components of the source cell and the components of the target cell are under the control of different controllers—the target/source components in the WIO network are under the control of the target/source gatekeeper 4 and the source/target components in the external network are under the control of an external controller such as a mobile switching centre 26.

The source IMC 3 determines that a handover to an adjacent cell is required in accordance with the procedure described above. When threshold level T1 is reached, subject to any other overriding parameters, the IMC 3 issues a HRI message in a packet-based format for transmitting on the IP-router 10 to the gatekeeper 4. The source intranet mobile cluster interface 3 also generates, in packet form, a control and signalling message The source gatekeeper 4 receives the HRI message from the source intranet mobile cluster interface 3. As described above, within the HRI message there is a list of cell identifiers for potential target intranet mobile cluster interfaces to which the call could be handed over (the candidate list).

In this embodiment, the target intranet mobile cluster identified in the candidate list is not located in the same H.323 zone as the source intranet mobile cluster interface 3, nor even in the same network. In fact it is a base station controller 27 located in an external network. Thus the target base station controller 27 is controlled by a mobile switching centre 26 in a manner conventional to GSM.

From the candidate list, the source gatekeeper 4 selects the first target intranet mobile cluster interface on the list (i.e. the external base station controller) and identifies its respective controller (i.e. the mobile switching centre 26).

The source gatekeeper 4 then forwards a handover required indication HRI message, via the external IP-router 30 or Internet to the A-interface gateway 8 (FIG. 4b). The A-interface gateway 8 converts the packet-based message into a conventional GSM format message such as a time-slot based message and sends it to the mobile switching centre 26.

The mobile switching centre 26 then sends a handover request HR to the target base station controller 27. If the target base station controller 27 is able to accept the handover, it sends a handover request acknowledgement signal HRA to the mobile switching centre 26. The mobile switching centre 26 then sends a handover command message HCM to the source gatekeeper 4.

On receiving the handover command message HCM, the source gatekeeper 4 begins to set up the appropriate communications links between the A-Interface gateway and the destination cell (BSC 50 and BTS 24) in which the MS B is operating. The mobile switching centre 26 also begins to set up the appropriate communications links between the target BSC 27 and the destination BSC 50 on the external network side.

Once the appropriate communications links have been set up, the source gatekeeper 4 instructs the source intranet mobile cluster interface 3 to execute the handover. If the handover is detected on the target side the target BSC 27 sends a handover detect message (HDM) to the MSC.

If the handover is successfully performed, the target base station controller 27 sends a handover complete message HCOM to the mobile switching centre 26 (FIG. 4c). The call PAYLOAD is switched to the target BSC 27 and the MSC 26 then disconnects the existing communications links between the source cell and the destination cell.

In a fifth embodiment of the present invention an anchor gatekeeper is defined as the gatekeeper through which the original call was set up. In this embodiment, all H.323 and H.245 call signalling, for example the setting up of the communications links between the target cell and the destination cell, and the subsequent disconnection of the existing communications links between the source cell and the destination cell, is controlled by the anchor gatekeeper.

In the instance wherein the source gatekeeper 4 controlled the set up of the original call, the anchor gatekeeper is the source gatekeeper 4. However, if the set up of the original call was controlled by a different gatekeeper to the source gatekeeper 4, then that gatekeeper is the anchor gatekeeper, and all call signalling is routed through it.

For example, if mobile station A is located in a first H.323 zone when the call is set up, the call set up is controlled by the gatekeeper of the first H.323 zone. This is the anchor gatekeeper. If the mobile station A then moves into a second H.323 zone, the handover to that zone is made in accordance with the second embodiment described hereinabove under the control of the anchor gatekeeper of the first H.323 zone.

If subsequently, the mobile station A then moves into a third H.323 zone, the gatekeeper of the second H.323 zone becomes the source gatekeeper 4, the gatekeeper of the third H.323 zone becomes the target gatekeeper 25, but the gatekeeper of the first H.323 zone remains the anchor gatekeeper.

During the second handover, therefore, the source gatekeeper 4, having received a handover required indication (HRI) message from the source intranet mobile cluster interface 3, forwards this HRI message, together with the control and signalling message also generated by the source intranet mobile cluster interface 3, to the anchor gatekeeper, i.e. the gatekeeper of the first H.323 zone. The anchor gatekeeper then performs the handover procedures described above, by issuing a handover request (HR) to the IMC of the third zone. After handover, the call is set up between the first and third zones, with the anchor still located in the first zone.

All H.323 and H.245 call signalling, such as the setting up of the communications links between the target cell and the destination cell and the subsequent disconnecting of the existing communications links between the source cell and the destination cell are controlled by the anchor gatekeeper.

The invention claimed is:

1. A cellular communications network comprising:
a plurality of controllers for controlling cells in the cellular communications network, the controllers being arranged to receive RF information from at least one mobile station in the network, at least one gatekeeper connected to said controllers by a switched packet communication path, wherein each controller includes means for generating a handover required indication for a call in which the controller is engaged and packet generating means for generating a packet addressed to said gatekeeper and including control information comprising a candidate list of alternative cells to which the call could possibly be transferred and wherein the gatekeeper includes selection means for selecting one of said alternative cells in said candidate list and packet generating means for generating a packet for sending a handover request for handing over the call to said one of said alternative cells.

2. A network according to claim 1, wherein said controllers are under the common control of said at least one gatekeeper to define a network zone within which handoff is to be effected, wherein the packet generated by said gatekeeper is addressed to one of said controllers in said zone.

3. A network according to claim 1, which is an internal cellular communications network and which comprises an interface for connection to an external network which includes an external controller, wherein the packet generated by said gatekeeper is addressed to said external controller.

4. A network according to claim 1, wherein data defining network specific resources is held at each controller.

5. A network according to claim 4, wherein said data defining network specific resources defines GSM specific end system information.

6. A network according to claim 1, which comprises a plurality of gatekeepers each controlling a set of said controllers defining individual network zones, wherein a handoff request is to be effected between said zones, the packet generated by said at least one gatekeeper being addressed to at least one other gatekeeper in the network.

7. A network according to claim 6, wherein one of said gatekeepers is defined as an anchor gatekeeper through which all handoff requests are routed.

8. A method comprising:
effecting handoff of a call in which at least one mobile station is engaged in a cellular communications network comprising a plurality of cells;
receiving from said mobile station a handoff required indication indicating that handover is needed from a source controller to a target controller;
formulating at the source controller a packet addressed to a source gatekeeper, said packet including control information comprising a candidate list identifying possible alternative controllers; and
at the source gatekeeper, determining to which one of said target controllers within said candidate list a handoff request should be forwarded and formulating a packet for forwarding to said target controller;
wherein handover is to be effected between two network zones, each having a respective gatekeeper and wherein the packet generated by the source gatekeeper is addressed to a target gatekeeper identified from the candidate list.

9. A method according to claim 8, wherein the source gatekeeper is defined as an anchor gatekeeper, and all handover requests are routed through said anchor gatekeeper.

10. A method according to claim 8, wherein the candidate list comprises local area codes and cell identifiers from which possible alternative target controllers can be resolved.

11. A method according to claim 8, wherein handover is to be effected from an external network having an external controller, wherein the gatekeeper is arranged to receive a packet from an interface unit from said external network.

12. A cellular communications network comprising:
a plurality of controllers for controlling cells in the cellular communications network, the controllers being arranged to receive RF information from at least one mobile station in the network, at least one gatekeeper connected to said controllers by a switched packet communication path, wherein each controller includes a generating unit configured to generate a handover required indication for a call in which the controller is engaged and a first packet generating unit configured to generate a packet addressed to said gatekeeper and including control information comprising a candidate list of alternative cells to which the call could possibly be transferred and wherein the gatekeeper includes a selection unit configured to select one of said alternative cells in said candidate list and a second packet generating unit configured to generate a packet for sending a handover request for handing over the call to said one of said alternative cells.

13. A network according to claim 12, wherein said controllers are under the common control of said at least one gatekeeper to define a network zone within which handoff is to be effected, wherein the packet generated by said gatekeeper is addressed to one of said controllers in said zone.

14. A network according to claim 12, which is an internal cellular communications network and which comprises an interface for connection to an external network which includes an external controller, wherein the packet generated by said gatekeeper is addressed to said external controller.

15. A network according to claim 12, wherein data defining network specific resources is held at each controller.

16. A network according to claim 15, wherein said data defining network specific resources defines GSM specific end system information.

17. A network according to claim 12, which comprises a plurality of gatekeepers each controlling a set of said controllers defining individual network zones, wherein a handoff request is to be effected between said zones, the packet generated by said at least one gatekeeper being addressed to at least one other gatekeeper in the network.

18. A network according to claim 17, wherein one of said gatekeepers is defined as an anchor gatekeeper through which all handoff requests are routed.

* * * * *